United States Patent [19]

Jung

[11] 4,389,235

[45] Jun. 21, 1983

[54] BURNER FOR MANUFACTURE OF FUSED QUARTZ OR FUSED SILICA INGOTS

[76] Inventor: Lothar Jung, 1355 Plymouth Rd., Bridgewater, N.J. 08807

[21] Appl. No.: 346,111

[22] Filed: Feb. 5, 1982

[51] Int. Cl.³ .................................................. C03B 19/04
[52] U.S. Cl. .......................................... 65/302; 65/18.2; 65/18.4; 65/335; 65/347; 65/DIG. 8; 427/193
[58] Field of Search .................... 65/18.2, 18.4, 302, 65/335, 347, DIG. 8; 427/193

[56] References Cited

U.S. PATENT DOCUMENTS

| | | | |
|---|---|---|---|
| 1,368,990 | 2/1921 | Scharl | 65/72 |
| 3,853,520 | 12/1974 | Rau | 65/302 X |
| 3,902,885 | 9/1975 | Rau | 65/302 |
| 4,188,201 | 2/1980 | Jung | 65/302 |
| 4,212,661 | 7/1980 | Jung | 65/18 |

Primary Examiner—Arthur D. Kellogg
Attorney, Agent, or Firm—Kenway & Jenney

[57] ABSTRACT

The elongated burner is described which is capable of providing a ribbon of flame through which particulate material as small as 1 micron is uniformly dispersed and transported onto a rotating forming surface for formation of an ingot. In a preferred embodiment the burner is provided with a hollow interior defined by a cylindrical surface interrupted by a longitudinal groove in communication with a longitudinal discharge slot. The sides of the groove are sloped at an angle steeper than the angle of repose of the particulate material. In the preferred embodiment the exterior surface of the burner is likewise provided with a longitudinal groove in communication with the discharge slot and providing two surfaces angled toward each other and toward the path through which the discharged material travels. At least one linear array of orifices is spaced along each of the angled surfaces so that flame emanating from the orifices in one angled surface will converge with the flame emanating from the orifices of the opposite angled surface at a point within the path of the discharged material.

13 Claims, 6 Drawing Figures

BURNER FOR MANUFACTURE OF FUSED QUARTZ OR FUSED SILICA INGOTS

BACKGROUND OF THE INVENTION

1. Field of the Invention

This invention relates to the manufacture of ingots of fused quartz or fused silica of the type which serve, for example, as preforms for the manufacture of high quality fused quartz or fused silica tubing.

2. Prior Art

My prior patent U.S. Pat. No. 4,188,201 discloses an apparatus for forming a hollow ingot within a cylindrical housing rotatable around a horizontal axis. In that apparatus, the cylindrical interior surface of the housing is lined with a layer of granular and/or solid refractory-type material. That invention included an elongated member which serves the dual function of a feeder for particulate ingot-forming material and of a burner for melting that material. U.S. Pat. No. 4,188,201 further describes one embodiment of the apparatus as including a split tube concentric with the hollow interior or the feeder/burner and rotatable and slidable therein. The split in the tube allows for convenient filling of the tube with the particulate feed simultaneous with insertion of the tube into the furnace. By rotation of the split tube the particulate material could be discharged by gravity through a slot in the feeder/burner. The discharged material clings to the rotating inner surface of the housing due to centrifugal force and is carried to an upper portion where it is melted by flames emanating from orifices spaced along the surface of the feeder/burner opposite the discharge slot.

While the apparatus disclosed in my earlier patent U.S. Pat. No. 4,188,201 has proven admirably suited for producing ingots from a particulate material 50 microns in size and larger, difficulties have been encountered in utilizing materials smaller than 50 microns. In view of the ready availability of silica raw materials of particle sizes within the range of 1-50 microns in various areas of the world, a need has existed for a new apparatus capable of converting such materials into high quality ingots.

SUMMARY OF THE INVENTION

The present invention provides an elongated burner for forming a fused silica quartz ingot by flame spraying particulate ingot forming material onto a rotating forming surface. The elongated burner is provided with either a longitudinal gas orifice or slot or with a series of orifices arranged along its length to provide a ribbon of flame for impingement on a rotating forming surface. The burner also functions as a feeder for the particulate material and is adapted to discharge the particulate material uniformly throughout the flame. Accordingly, the burner is provided with a hollow interior for receipt of the particulate material and a discharge port or ports for introducing the particulate material into the flame. Such a burner has proven capable of producing high quality fused quartz and fused silica ingots from particulate material as small as 1 micron, although its utility is not limited to the handling of so fine a material.

In the preferred embodiment the hollow interior of the burner is provided with a groove or longitudinal trough having sides sloped at an angle steeper than the angle of repose of the particulate material. The groove or trough communicates with a longitudinal slot extending along the length of the burner. A second longitudinal groove, also in communication with the longitudinal slot, is provided on the outside of the burner. The slot serves as a discharge port for particulate material introduced into the interior of the burner. A slotted tube, concentric with hollow interior of the burner and rotatable therein may be used for introduction of the particulate material. The second (exterior) longitudinal groove provides a pair of opposing surfaces on either side of the slot with at least one linear array of orifices on each opposing surface, closely spaced to provide flames merging to form a ribbon. The surfaces of the exterior groove are angled so that the flame emanating from one surface will converge with the flame emanating from the opposite surface at a point within the path of the discharged particulate material.

Accordingly, it is an object of the present invention to provide an elongated burner adapted to uniformly feed a particulate material through a path coextensive with a ribbon of flame emanating from the burner.

Another object of the present invention is to provide such a device capable of converting silica or quartz of a particle size of 1-50 microns into high quality ingots.

These and other objects, features and advantages of my invention will become apparent from a reading of the detailed description to follow, in conjunction with the accompanying drawings.

DETAILED DESCRIPTION OF SEVERAL PREFERRED EMBODIMENTS

Figure 1:
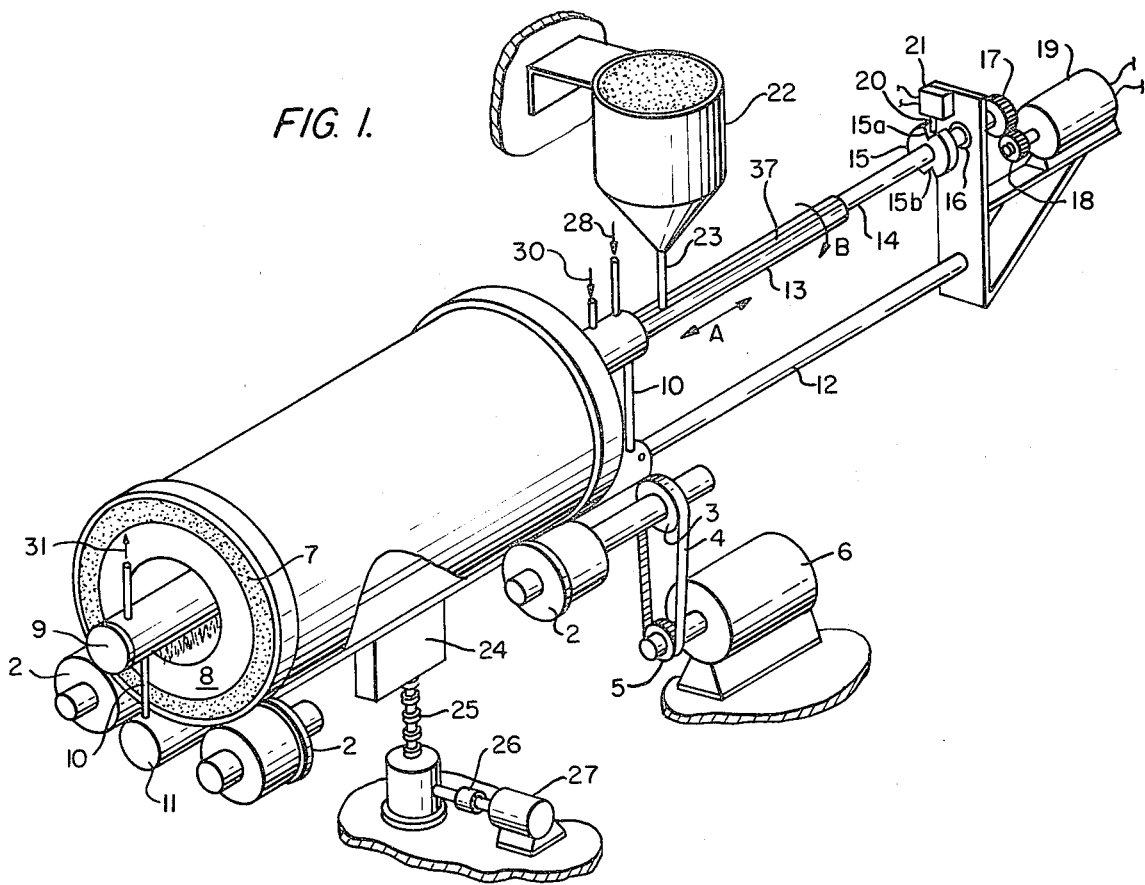
FIG. 1 is a perspective view of the apparatus in which a hollow ingot is produced, inclusive of the spray burner of the present invention.

In FIG. 1, reference numeral 1 designates a cylindrical furnace housing of a suitable metal, located on four cylindrical rollers 2. These rollers are attached to a frame not shown here for the sake of clarity.

The shaft of one of the four rollers is connected to a pulley 3 and, through a belt 4, to still another pulley 5 which in turn is connected to the drive shaft of an electrical motor 6, thus providing for the transmission of energy to rotate the furnace housing around its horizontal axis at a suitable speed in the direction of the arrow B shown in FIG. 1.

A cylindrical layer of a granular and/or solid refractory type material with high temperature capability and poor thermal conductivity designated by reference number 7 is held in place by the centrifugal force caused by the rotation of the housing. A hollow ingot 8 is shown extending inwardly toward the center of the housing. The remaining space in the center of the hollow ingot 8 contains an elongated spray burner 9.

The spray burner 9 in turn is suspended in a stationary position by two cylindrical holders 10 on the outer body of an air or fluid operated cylinder 11, located outside and directly underneath the rotating furnace housing. Extending from the body of the air or fluid operated cylinder 11 is a piston rod 12 which serves in turn as a holder for a powder feeder device 13.

The powder feeder device 13 includes a longitudinally split tube 13 which is exactly fitted to the inner diameter of the hollow spray burner 9, whose end section is attached to a solid rod 14. The rod 14 in turn is rigidly fastened to a disc 15, through a rotatable bearing 16, and finally ends in a sprocket 17. Another sprocket 18, mounted on the drive shaft of the electrical motor 19, suitably engages the sprocket 17.

A special feature of the disc 15, as shown in FIG. 1, is to provide two opposed identations 15a and 15b on its circumference for the purpose of defining two exact positions, when the pin 20 of the solenoid 21 engages in them.

A container of fusing quartz powder 22, which includes a nozzle 23, rests suitably suspended over the open slot 37 of the powder feed tube 13.

The entire arrangement is supported by a plate 24 attached to the body of the cylinder 11. A spindle drive 25 combined with a coupling 26 and an electrically operated motor 27 has been provided in order to focus the flames of the spray burner onto the inner surface of the hollow fused quartz ingot 8.

The spray burner 9 includes inlet port 28 for the combustion gases and inlet port 30 for cooling water which is drawn off at the exit port 31 at the other end of the unit.

In order to fill quartz powder into the feeder tube 13 and charge the furnace, an empty feeder tube 13 is completely removed from the interior of the elongated spray burner 9 and suitably exposed to the quartz powder feeder nozzle 23 which is connected to a container 22. Quartz powder is fed by gravity into an open slot 37 of the feeder tube 13.

With the aid of the air or fluid operated cylinder 11, the powder feeder tube 13 is moved to the inside of the spray burner 9, as shown by the arrow A, at the same time the feed tube 13 is being loaded with fusing quartz powder. Toward the end of the travel of the feeder tube 13 the filling is terminated when the solid section 14 of the tube 13 travels underneath the powder nozzle 23 and is sealed off.

Figure 2:
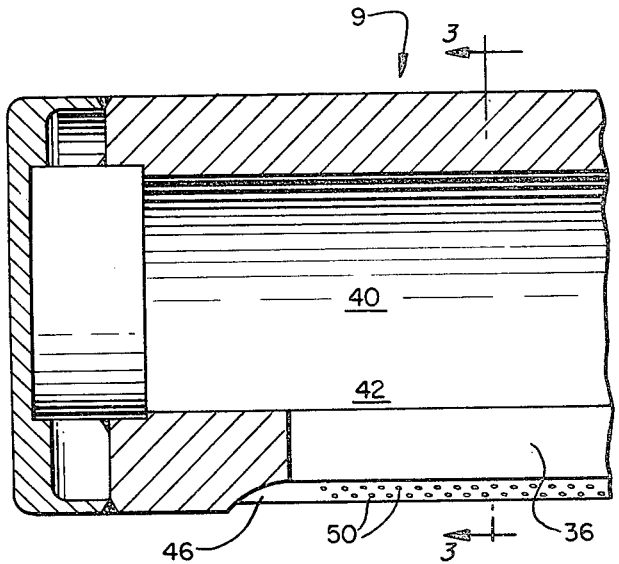
FIG. 2 is a longitudinal view, partially in cross-section, of the spray burner of FIG. 1.
Figure 3:
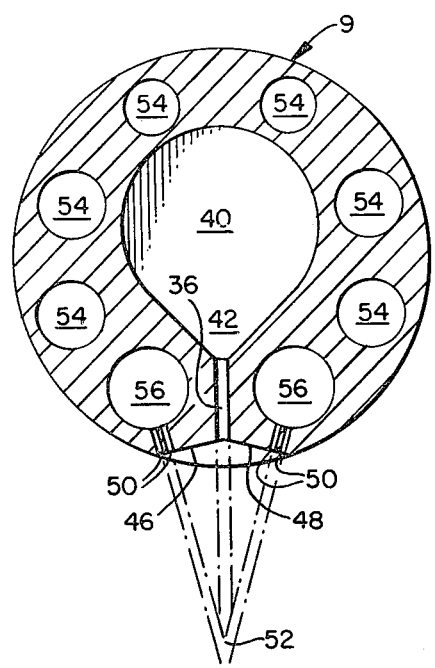
FIG. 3 is a cross-sectional view of the spray burner taken along line A-B in FIG. 2.

Next, the drive motor 19 begins to rotate the feeder tube 13 in the direction of the arrow B, within the elongated gas spray burner 9, until the slot 37 is directly over the discharge slot 36 shown in FIGS. 2 and 3. In this position the motor 19 will be interrupted by the solenoid 21 when the pin 20 engages the indent 15b on the disc 15, causing the feeder 13 to be locked into position. After the quartz powder has been slowly discharged through the slot 36 and fused onto the rotating surface of the ingot 8, the solenoid will be actuated by a timing device (not shown).

Next, the feeder tube 13 rotates back into the upright starting position and upon reaching this position is held again by the pin 20 engaging the indent 15a in the disc 15.

Now the linear motion of the feeder pipe is started up by the air or fluid operated cylinder 11 which is also actuated by the timing device mentioned above.

The tube 13 is withdrawn from the elongated spray burner 9 and quartz powder begins to charge through the slot 37 after the nozzle 23 has been freed from the sealing rod 14. From here on the process repeats itself for as many times as required for the completion of one ingot.

Referring now to FIGS. 2 and 3, the elongated spray burner 9 is shown in greater detail.

For the sake of clarity, FIG. 2 shows the spray burner 9 in a partially sectioned view. As seen in FIGS. 2 and 3 the elongated spray burner 9 is provided with a powder discharge slot 36 which is approximately coextensive with the length of the spray burner 9. Discharge slot 36 communicates with the hollow interior 40 of spray burner 9 through a groove 42 provided along the length of the hollow interior 40. The longitudinal groove 42 provides a pair of opposing surfaces each of which is angled at a slope steeper than the angle of repose of the quartz or fused silica powder feed. As shown in FIG. 3, the combination of discharge slot 36 and longitudinal groove 42 resembles, in cross-section, a funnel with a mouth opening to the hollow interior 40 of the spray burner. A second longitudinal groove 44 is provided on the exterior surface of the spray burner 9 and, again, is approximately coextensive with the length of the spray burner. Exterior longitudinal groove 44 is aligned with interior longitudinal groove 42 and in communication with discharge slot 36. Exterior longitudinal groove 44 provides a pair of opposing angled surfaces 46 and 48. A plurality of gas jets or orifices 50 are arranged along the length of each of surfaces 46 and 48 and are so closely spaced as to provide a continuous ribbon of flame emanating from each of surfaces 46 and 48, which flame ribbons are coextensive with the length of discharge slot 36. The gas jets or orifices 50 will suitably number several hundred on each of surfaces 46 and 48 and are arranged in at least one linear array on each of surfaces 46 and 48. Surfaces 46 and 48 are arranged at a suitable angle so that the flames emanating from each converge at a point 52 within the path through which the discharged particulate material travels. A combustible gaseous mixture is fed through longitudinal passageways 56 to the gas jets 50.

Spray burner 9 is further provided with a plurality of longitudinal passageways 54 drilled through the length of its body. The passageways 54 allow water to be introduced into one end of the spray burner, for example through inlet port 28 shown in FIG. 1 and a suitable header (not shown). Alternatively, half of the longitudinal passageways 54 can be provided for cooling water in one direction and the remaining portion of the longitudinal passageways 54 adapted to carry water in the opposite direction so that cooling water can be introduced and removed at a single end of the spray burner 9 via plural water headers or a single split water header.

Figure 4:
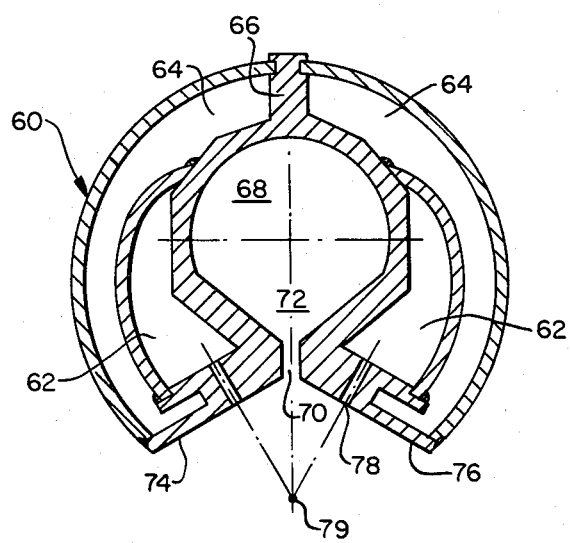
FIG. 4 is a cross-sectional view of another embodiment of a spray burner in accordance with the present invention.

FIG. 4 shows another embodiment of spray burner in accordance with the present invention in cross-section. The spray burner of FIG. 4, generally designated by the numeral 60, differs from that previously described principally with regard to the configuration of the gas supply ducts 62 and the water jackets 64 which perform the same functions, respectively, as gas supply ducts 56 and longitudinal passageways 54 of the embodiment depicted in FIGS. 2 and 3. Water jacket 64 is split along its length by a divider 66 so that one-half of the jacket can be used for water in and the other half used for water discharge. As in the previously described embodiment the hollow interior 68 of the spray burner 60 communicates with a longitudinal discharge slot 70 through a trough 72 which provides a pair of surfaces sloped at an angle greater than the angle of repose of the particulate feed material. Again, an exterior "groove" provides a pair of opposed surfaces 74 and 76 in each of which is located a plurality of gas discharge ports 78 arranged in at least one linear array on each surface and in communication with the gas ducts 62. The point of convergence or flame focal point for the flames emanating from surfaces 74 and 76 is shown at 79.

Figure 5:
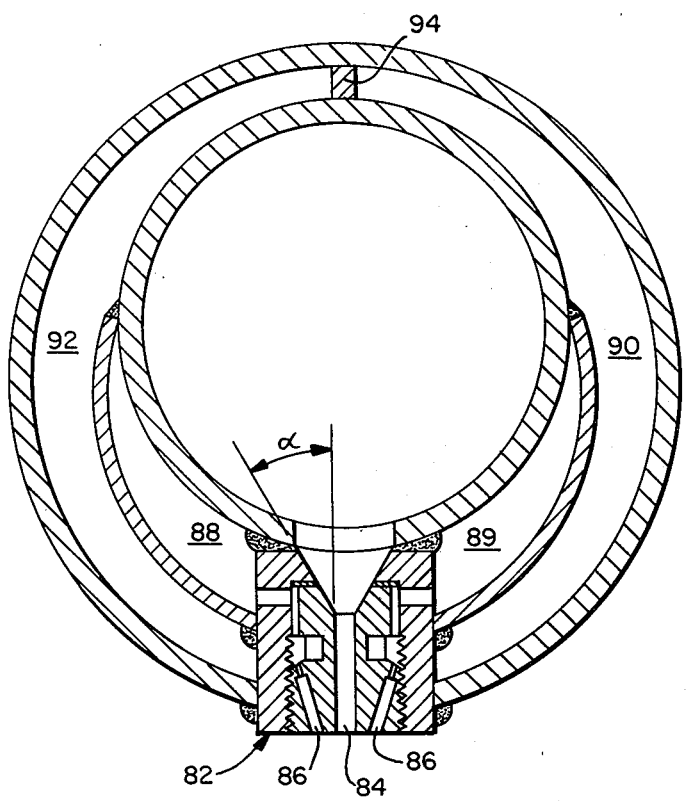
FIG. 5 is a cross-sectional view of yet another spray burner of the present invention.
Figure 6:
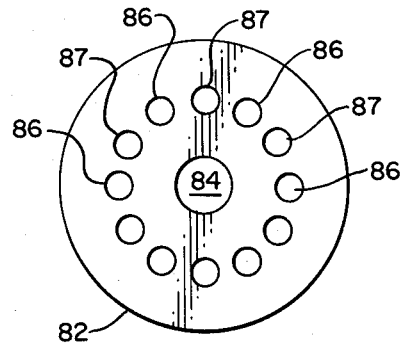
FIG. 6 is an end view of a burner nozzle of the spray burner of FIG 5.

FIG. 5 depicts yet another elongated spray burner, generally designated by the numeral 80, in accordance with the present invention. The elongated spray burner 80 is provided with a plurality of nozzles 82 spaced along its length. Each nozzle 82 provides at least one circular array of gas orifices surrounding a central port 84 for discharge of the particulate material. The gas orifices consist of fuel orifices 86 which alternate with air or oxygen orifices 87, orifices 86 being in fluid communication with gas supply jacket 88 and orifices 87 being in fluid communication with jacket 89 for the supply of air or oxygen. In this manner, a fuel gas can be post-mixed with the air or oxygen supporting combustion to provide an additional safety factor. In the previously described embodiments the fuel is supplied as a premixed combination of a fuel gas and air or oxygen. As in the previous embodiments, provision is made for cooling water here in the form of a single jacket split into two halves 90 and 92 by a longitudinal divider 94. The embodiment depicted in FIGS. 5 and 6 is presently deemed less preferred than the previously described embodiments due to difficulties encountered in obtaining a feed of particulate material which is uniform along a continuous path of deposition on the rotating forming surface as is provided by the previous embodiments.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description and all changes which come within the meaning and range of equilvalency of the claims are therefore intended to be embraced therein.

I claim:

1. A burner for producing an ingot from a particulate ingot-forming material by depositing and melting the particulate material on a rotating forming surface, said burner comprising:
   an elongated, generally cylindrical body member having a hollow interior or bore for receiving the particulate material;
   fuel supply means within said cylindrical body member;
   orifice means for receiving fuel from said fuel supply means and establishing a line of flame along a length of said elongated body member; and
   discharge means extending the length of said body member for distributing and discharging the particulate material simultaneously along a path generally coextensive with said orifice means, said discharge means being arranged with respect to said orifice means in a manner whereby the discharged particulate material passes through the flame and onto the rotating forming surface.

2. The burner of claim 1 further comprising a concentric tube fitted within the interior of said burner body member and rotatable therein, said concentric tube having at least one orifice for discharge of the particulate material received therein when said one orifice is rotated to a position where it aligns with said discharge means.

3. The burner of claim 1 further comprising means for introducing said particulate material into said hollow interior as a fluid suspension.

4. The burner of claim 1 wherein said orifice means comprises at least one linear array of discrete orifices, said linear array being adjacent and parallel to said discharge means.

5. A burner in accordance with claim 4 having at least two linear arrays of orifices including at least one linear array of orifices on each side of and parallel to said discharge means.

6. A burner in accordance with claim 5 wherein said linear arrays are angled so that the flame or flames emanating from a linear array on one side of said discharge means will converge with the flame or flames emanating from the linear array on the other side of said discharge means at a point through which the particulate material discharged from said discharge means travels.

7. A burner in accordance with claim 1 wherein the walls defining said hollow interior have a steeper inclination than the angle of repose of the particulate material.

8. The burner of claim 1 wherein said hollow interior is defined by a generally cylindrical surface interrupted by a groove in communication with said discharge means, said discharge means being a slot extending longitudinally along at least a major portion of the length of the burner, the combination of said slot and said groove resembling, in cross-section, a funnel having a mouth open to said hollow interior.

9. A burner in accordance with claim 8 wherein the mouth of said funnel is angled with respect to the vertical to provide a slope steeper than the angle of repose of the particulate material.

10. A burner in accordance with claim 1 having an outer surface of a generally cylindrical configuration interrupted by a grooved cut in communication with said discharge means and providing two surfaces angled toward said discharge means and toward the path through which the discharged particulate material travels, and wherein said orifice means comprises at least one linear array of orifices spaced along each of said angled surfaces so that flame emanating from the orifices in one angled surface will converge with the flame emanating from the orifices of the opposite angled surface at a point within the path of the discharged particulate material.

11. A burner in accordance with claim 1 wherein said discharge means is a plurality of discharge ports linearly spaced along the length of said burner and wherein said orifice means comprises an annular burner nozzle surrounding each of said discharge ports.

12. The apparatus of claim 11 wherein each burner nozzle terminates at a plurality of orifices and wherein said body member is provided with first and second gas supply jackets, each jacket being in fluid communication with a portion of said orifices for separate feeding of fuel and oxygen or air to each of said burner nozzles for combustion.

13. The apparatus of claim 12 wherein each of said first and second gas supply jackets forms an annular space or a part of an annular space around said body member.

* * * * *